United States Patent Office 3,752,732
Patented Aug. 14, 1973

3,752,732
REUSABLE, TEAR-RESISTANT POLYOLEFIN-PAPER LAMINATE
Lenart A. Peterson, Chicago Ridge, and John G. Finley, Worth, Ill., assignors to Phillips Petroleum Company
Filed Feb. 24, 1970, Ser. No. 13,413
Int. Cl. B32b 7/06, 13/12, 27/08
U.S. Cl. 161—165
5 Claims

ABSTRACT OF THE DISCLOSURE

A tough, tear-resistant, reusable, well-bonded polyolefin-paper laminate is formed by laminating a polyolefin film, preferably oriented, to a paper substrate by means of a melt of a polymer containing the same olefin as used in the film.

This invention relates to a reusable polyolefin-bonded-to-paper structure. In another aspect, it relates to an improved method of bonding a polyolefin to a paper substrate.

A presently used method of preparing cured adhesive compositions is to coat the adhesive on to a supported polyolefin film, apply a backing or other structure to the adhesive, then cure the adhesive at a suitable temperature. After curing, the supported polyolefin film is stripped off, and the adhesive structure is used in corn plasters, bunion patches, and other applications in the pressure sensitive tape field including pharmaceutical requirements. Concerns preparing such pressure sensitive tape assemblies prefer a release paper that is reusable. Single-use supports are relatively expensive and add needlessly to product costs. Efforts to reuse such supports usually are ineffective, due to poor tearing characteristics, and particularly attributable to insufficient adhesion of the polycoating to the base stock.

Needed is a structure that can be used repeatedly, used again and again. To meet this, the polyolefin film not only must be well supported, but it must be unusually well-bonded or laminated to the base stock. And, the structure must have good resistance to tearing, as well as good resistance to separation of the polycoating from the base stock. Such a structure can be used repeatedly, greatly reducing the cost of the ultimately prepared pressure sensitive tapes and similar adhesive coated structures.

This need is fully met by our invention. The structure of our invention is a polyolefin film well bonded to a paper substrate. The bonding is effected by use of a melt of a polyolefin prepared at least in part from the same olefin or combination of olefins common to the polymer used in the film to be bonded. The film, preferably an oriented film, optionally is release coated on its outer surface. The substrate, also, can be optionally release coated on its exposed surface.

The structure of our invention is so effective that it is reusable 10, even 15 times. Thus, the cost of the user of his support is 1/10 or 1/15 what it has been heretofore.

It is an object of our invention to provide a repeatedly reusable bonded polyolefin-paper structure.

Other aspects, objects, and the several advantages of our invention will be apparent to one skilled in the art from our description including the figures of our drawing and from our appended claims.

Our invention can be more readily understood by referring immediately to the attached drawing which shows three figures. These figures show the structure of our invention, together with a method of preparing the structure.

Figure 1:
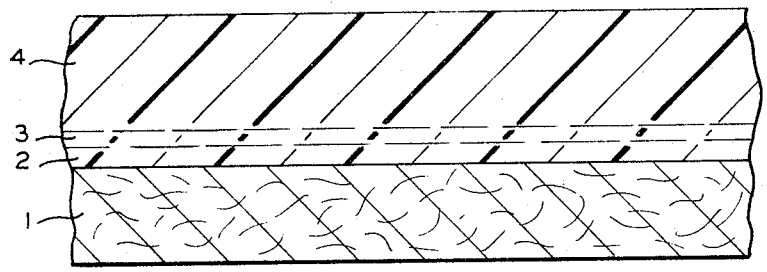
FIG. 1 illustrates the basic structure of our invention and shows in combination a paper base, the bonding polyolefin, and the bonded polyolefin film.
Figure 3:
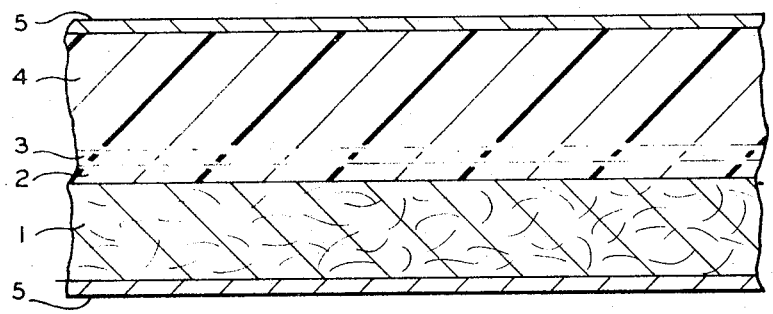

FIG. 3 adds to the basic structure of FIG. 1 optional release coatings on the external surfaces of both the base and the film.

In FIG. 1, the first layer 1 is the base or substrate or backing sheet. The next layer 2 is the bonding layer formed from a melt of a polyolefin, and this also is shown with a merging area 3 as it bonds with the polyolefin film 4 itself. The bond between the polyolefin film and the base or substrate is sufficiently strong for the entire structure to be repeatedly processed, receiving adhesive and superstructures, curing of such adhesive, stripping of cured adhesive-superstructure combinations, and reused again and again as a support structure.

A variety of materials can be employed as a base or substrate. Fibrous cellulosic sheet materials are preferred, such as bleached paper and the like as well as papers made from pulps prepared by chemical, mechanical, or chemical-mechanical processes other than the Kraft process. Kraft paper is particularly suitable in general because of its overall properties. We prefer a Kraft paper with a basis of from 25 pounds per 3,000 square foot-ream upward to 100 pounds per ream. The substrate to be used should have sufficient rigidity so that folding or wrinkling does not occur on handling and forming and bonding of the polyolefin film. The preferability of a Kraft, and particularly extensible Kraft, is due to its ability to provide a certain amount of give during repeated handlings, to avoid any tendency to break or crack, which would pose difficulties in continued reuse.

While Kraft-type paper is preferred, other materials can be utilized such as Holland cloth; or glassine, which is a super-calendered paper whose name is derived from its peculiarly glossy surface, high density and transparency.

Usually, the base is pretreated which tends to assist the polyolefin melt to bond with the paper. The pretreatment is not a necessity, since acceptable bonding to unpretreated paper often can be attained by using a polyolefin melt temperature in the upper part of the recommended range as discussed hereinafter.

In discussing the polyolefins useful in bonding and for the film, the term polyolefin refers to the polymeric material of a 1-olefin of from 2 to 8 carbon atoms per molecule, and includes copolymers between two or more thereof, and further includes copolymers having up to 25 weight percent of monomers commonly copolymerized therewith.

The preferred polymers are either homopolymers of propylene or copolymers of propylene with ethylene. In our experience, the polypropylene films have been preferred since they tend to better withstand temperatures at which the later applied adhesive is cured in preparing the pressure sensitive tapes and the like.

Most preferred are the oriented films, i.e., stretched from 2 to 12 times relative to the original film dimension, resulting in a tensile strength of from 8,000 to 20,000 p.s.i. Most desired are those films which are biaxially oriented.

The film itself usually will have a thickness of from 0.2 to 5 mils, preferably from 0.75 to 2 mils. The polyolefin from which it is formed should have a melt flow broadly of between 0.2 and 20, preferably between 1 and 6, as determined by ASTM Method D1238–62T (condition L for propylene polymers and condition E for ethylene polymers); the density should range from 0.89 to 0.97 gm./cc. as determined by ASTM Method D1505–63T.

The polyolefin used for the bonding, as a melt, can be any of the polyolefins as described above relative to the polyolefin film. However, two distinctive properties should be possessed by the polyolefin used for the melt. Firstly, the major monomer component should be the same as that of the primary monomer in the polyolefin film, so as to obtain optimum adhesion and bonding properties. Secondly, the polyolefin used for the melt preferably should have a high melt flow so as to minimize disorientation of the film where an oriented film is utilized, though this requirement is not a necessity when a non-oriented film is utilized, preferably should be higher than that of the film, and can be from about 20 to 100, more preferably from 50 to 80.

The polyolefin bonding melt is extruded at a melt temperature of from 350 to 700° F., more usually from 350 to 650° F., preferably 450 to 600° F. The amount of the polyolefin melt applied will usually be within a range of from 3 to 16 pounds of the melt per 3,000 square foot-ream of the base, more usually between 8 and 14 pounds per ream.

As discussed above, the higher portion of the melt temperature range, above 600° F., can be used if desired where an untreated paper base is to be bonded, since the higher melt extrusion temperature gives improved bonding with untreated bases. A caution should be exercised, of course, that if the melt temperature is too hot, it can tend to disorient the film, especially films below about 0.2 mil thick. Therefore, the melt temperature preferably is maintained below 600° F. and a pretreated substrate is preferred so as to obtain most effective bonding at lower melt temperatures, and films thicker than 0.2 mil are preferred.

Another method to improve bonding is to preheat the substrate, and the paper substrate can be preheated to any temperature up to below a darkening or loss-of-strength stage for the particular base utilized. A preheated base tends to bond more effectively to the melts hence there is less tendency for a cooled surface melt film to develop and possibly interfere with bonding.

Where the base stock is to be pretreated, pretreatment can be with any suitable primer known to the art. One suitable primer is prepared from a polyalkyleneimine such as a polyethyleneimine which is available from Eastman Chemical Products, Inc., subsidiary of Eastman Kodak Co., Kingsport, Tenn. Such pretreatment is usually applied by means of a gravure roller using a 50 to 1,000 foot per minute line speed, more usually of the order of 200 feet per minute, and applying at a rate of from about 0.5 to 5.0 pounds per ream on a wet basis with a hydrocarbon solvent such as toluence or n-hexane, or at the rate of 0.01 to 0.10 pound per ream on a dry solids basis. The material usually is applied on a basis of about 0.04 pound of dry solid per pound of solution including solvent.

Figure 2:
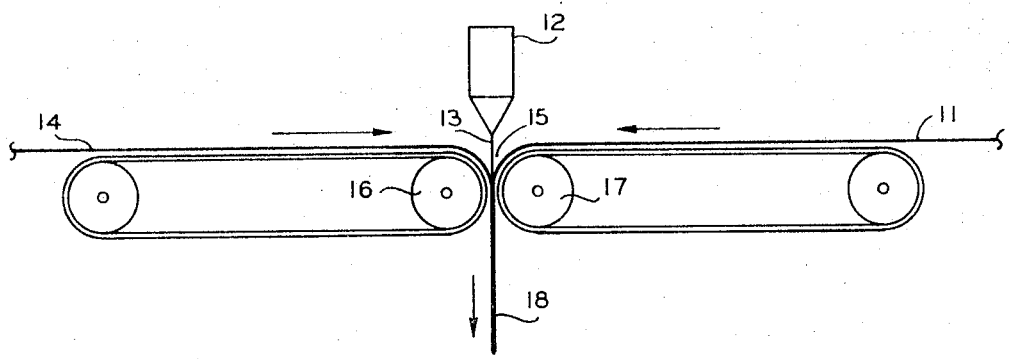
FIG. 2 illustrates the method of forming the structure of our invention by melt bonding a polyolefin film with a polyolefin melt to a paper base.

Referring now to our FIG. 2, this illustrates in basic fashion the process of lamination utilizing materials that we have described above. The paper is shown as 11, the polyolefin melt 12 to be supplied as a bonding web or extrudate 13 for bonding, and the polyolefin film 14. The three components are brought together so that the melt is brought to the nip 15 of rollers 16 and 17. Roller 16 normally wil be a chill roll through which is circulated water at a temperature of 60 to 75° F. and roller 17 a rubber backup roll. It is preferred to use a roll pressure in the range of 10 to 100 p.s.i., preferably 40 to 70 p.s.i. These rollers press the combination of the paper base 11, bonding polyolefin melt 12, and polyolefin film 14 together, resulting in the structure 18 of our invention. Line speed usually will be in the range of 50 to 1,000 linear feet per minute, more usually on the order of 200 feet per minute. Line speeds can be adjusted according to the ability of the equipment to handle the materials, extrusion rate of the melt to be utilized, and the like.

The basic structure of our invention optionally can be release coated on either the exposed outer surface of the polyolefin film, or on the exposed outer surface of the base or substrate, or both. FIG. 3 shows the basic structure of paper 1, bonding polyolefin 2, merging area 3, bonded polyolefin film 4, and additionally shows coating 5 and 5', each being a release coating applied to the outer surface as shown in the drawing.

These release coatings are curable silicones, often called the organopolysiloxanes. They have the general repeating structure

where R is a hydrocarbon radical and one of the R groups can be hydrogen. R can be any suitable monovalent hydrocarbon radical such as alkyl, cycloalkyl, aryl, alkaryl, and aralkyl, or combinations thereof. Preferably, each R is selected from alkyl radicals containing from 1 to 6 carbon atoms, and phenyl. The methyl radical is frequently employed in such compositions. In some compositions an ether linkage —O— is substituted for one of the R groups in order to provide for additional cross-linking effects. These organopolysiloxane release coatings and methods of application of same are well known to the art.

The release layers applied to the outer surface of the base paper or to the outer surface of the polyolefin film, or both, are desirable where particular applications of the entire composition assembly are intended. The above described organopolysiloxane in solution are applied in amounts, on a dry basis, within the range of from 0.03 to 0.4, preferably 0.06 to 0.3 pound per ream. Most desirably, such release coating is applied to the outer surface of the polyolefin film, since the anticipated purpose of the structure of our invention is to be used to support an adhesive which is coated on the polyolefin of our structure, a backing such as corn plaster composition and the like is applied, or tire patching or a myriad of other useful applications, and the adhesive then is cured at a fairly high temperature. After curing, it is desired that the users' own construction including cured adhesive be readily stripped from the structure of our invention, and the structure of our invention then reused multiple times. For this purpose, a suitable release coating on the polyolefin is desired.

Rather frequently, the customer, after applying his adhesive, and applying his own construction or superstructure, rolls the entire assembly for convenience in curing. The optional release coating on the paper or substrate outer surface helps avoid any sticking problems. Of course, this curing method is not necessary, since the entire assembly can be cured in line at suitable temperatures and the bonded polyolefin structure of our invention then is stripped also in line on a continuous or semi-continuous basis.

The effectiveness of our invention can be readily shown from the following results of actual runs.

EXAMPLE I

A 50 pound per ream extensible Kraft paper substrate was used in this run. The paper was pretreated in line using the hereinbefore described Eastman Chemical Products, Inc. primer, a polyethyleneimine solution, which was applied at the rate of 2 pounds of wet solids per ream of paper, equivalent to 0.04 pound of dry solids per ream. This preheating composition was received at 5 percent solids and was reduced to 2 percent solids for actual application using toluene as solvent with application to the paper by a 150 quadrangular gravure roller with cells 24 microns deep at a line speed of 200 linear feet per minute.

The polyolefin film used was a 50 gauge biaxially oriented polyprolene film. The polyolefin film, i.e., the polypropylene film in this run, was corona treated on one side. The untreated side was then bonded to the paper base using as bonding agent a melt of a propylene-ethylene copolymer.

The melt flow of the polypropylene film was 4, and the density of the polypropylene in the film was 0.90 gms./cc. Melt flow of the polypropylene in the melt was about 70, and the density of the polypropylene used in the melt was 0.90 gms./cc. A melt temperature of approximately 575° F. was used, and 12 pounds of the melt was applied per ream of base to achieve the bonding.

After bonding, the composition was overcoated in line with an organopolysiloxane release coating using a 150 quadrangular cell, of 24 microns depth, gravure cylinder. The organopolysiloxane was applied as a solution in toluene as diluent. X-ray examination of samples from 11 rolls indicated that the amount of organopolysiloxane applied, on a dry basis, ranged from 0.238 to 0.285 pound per ream.

Examination of the release characteristics of the silicone coated side of the final composition showed a release of 20 grams per inch width at 180° pullback using a J & J patch test, Tappi RC-283. The release broadly desired is from 1 to 75 grams per inch width at 180° pullback, preferred range is from 5 to 50 grams per inch width. Eleven rolls showed a range of 9 to 19 grams per inch width. Thus, the bonded supported polyolefin film, well bonded and supported for processing and repeated applications, is readily strippable from adhesive structures subsequently added by the customer, and hence can be readily reused. Examination of the laminate disclosed excellent adhesion of film to paper which strongly resisted delamination.

EXAMPLE II

A further run was made, again using production line equipment, with paper base, polypropylene film, and all materials and equipment the same as described in Example I above.

Again, the release value for the release coating, and the bonding strength of the laminate, were essentially the same as reported above. This example shows the repeatability of our invention, on commercial equipment, and that it can be produced readily and consistently. The produced structures have been used from 10 to 15 times without delamination.

The bonded polyolefin-paper composition of our invention is useful and versatile in the production of many types of products, as will be observed from the foregoing discussion. The composition is one that can be readily used and reused time and again, as a support for adhesive based superstructures pending assembly and processing of same. Such adhesive based superstructures, after curing and necessary processing, can be readily released or stripped from our polyolefin bonded laminate, and the polyolefin bonded laminate then reused repeatedly.

Reasonable variations and modifications of our invention are possible within the scope of this disclosure, yet without departing from the scope and spirit thereof as discussed hereinabove and in the claims that follow.

We claim:

1. A polyolefin and substrate laminate suited to repeated reuse as a support for flexible structures, comprising in order:
    a fibrous cellulosic backing sheet,
    a polyolefin bonding layer on said backing sheet and melt-bonded adherently thereto,
    a polyolefin film on said bonding layer and bonded adherently thereto by the melt-bonding of said polyolefin bonding layer,
    wherein said polyolefin bonding layer and said polyolefin film each contains as a major component a common 1-monoolefin monomer, said polyolefin of said bonding layer and of said film are polymers of at least one 1-olefin of from 2 to 8 carbon atoms per molecule and up to about 12 weight percent of a monomer copolymerizable therewith,
    said polyolefin of said bonding layer characterized by a melt flow of about 50 to 80, and said polyolefin of said film characterized by a melt flow of about 1 to 6.

2. The composition of claim 1 wherein said backing sheet is selected from paper, Holland cloth, and glassine.

3. The laminate of claim 2 wherein said polyolefin film is further characterized by a density of from 0.89 to 0.97 gms./cc., said backing sheet is paper and is a Kraft paper wherein said polyolefin bonding layer and said polyolefin film are each selected from homopolymers of propylene and copolymers of propylene-ethylene.

4. The composition of claim 3 wherein said film is from 0.2 mil to 5 mils in thickness, said melt is applied at a rate of from 3 to 16 pounds per ream of said backing sheet, backing sheet is pretreated with a polyalkyleneimine at the rate of from 0.01 to 0.1 pound per ream on a dry basis; said polyolefins are polymers of propylene; and said laminate further includes in order a curable organopolysiloxane cured on the outer surface at least one of said polyolefin film and said backing sheet.

5. The laminate of claim 4 wherein said polyolefin film is biaxially oriented.

References Cited

UNITED STATES PATENTS

| | | | |
|---|---|---|---|
| 3,403,045 | 9/1968 | Erickson et al. | 161—208 |
| 3,496,061 | 2/1970 | Freshour | 161—252 |
| 3,509,991 | 5/1970 | Hurst | 161—209 |

FOREIGN PATENTS

| | | | |
|---|---|---|---|
| 917,276 | 1/1963 | Great Britain | 161—252 |
| 919,065 | 2/1963 | Great Britain | 161—252 |
| 645,272 | 3/1964 | Belgium | 161—250 |
| 1,213,991 | 12/1961 | Germany | 161—247 |

ALFRED L. LEAVITT, Primary Examiner

C. B. COSBY, Assistant Examiner

U.S. Cl. X.R.

161—208, 209, 249, 250, 252, 406